(No Model.)
B. STEWART.
HOOF EXPANDER.
No. 410,041. Patented Aug. 27, 1889.
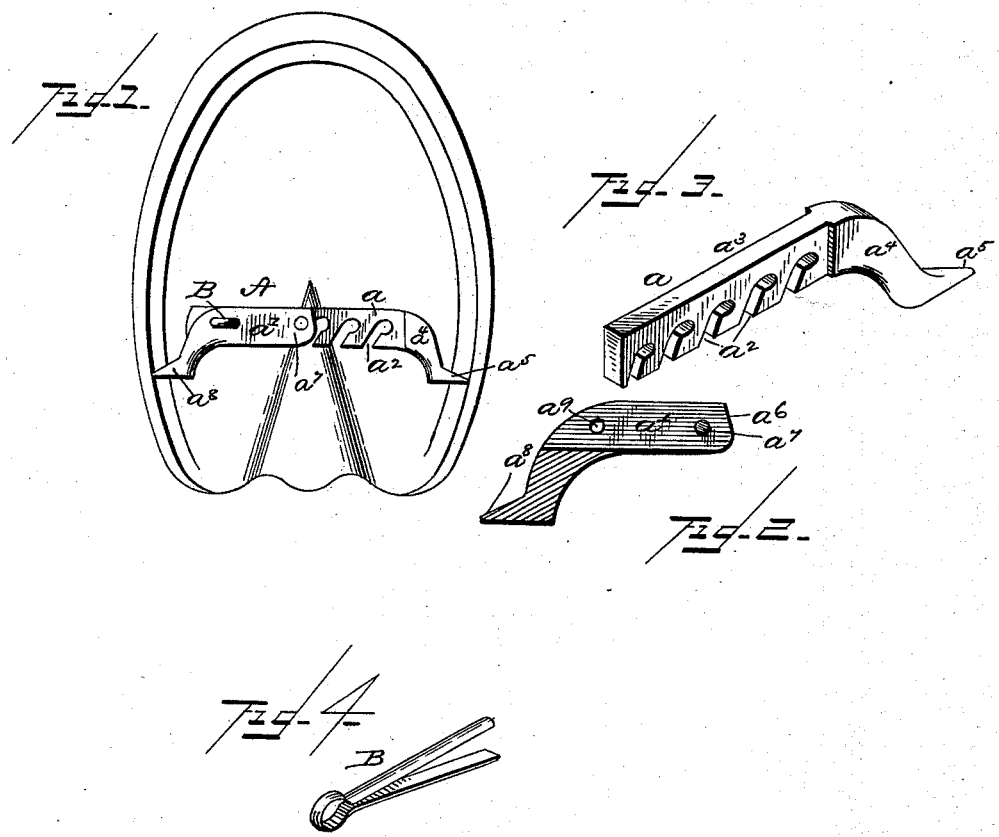
WITNESSES
INVENTOR

UNITED STATES PATENT OFFICE.

BURTON STEWART, OF SOUTH BEND, INDIANA.

HOOF-EXPANDER.

SPECIFICATION forming part of Letters Patent No. 410,041, dated August 27, 1889.

Application filed January 19, 1889. Serial No. 296,829. (No model.)

*To all whom it may concern:*

Be it known that I, BURTON STEWART, a citizen of the United States, and a resident of South Bend, in the county of St. Joseph and State of Indiana, have invented certain new and useful Improvements in Horse-Hoof Expanders; and I do hereby declare that the following is a full, clear, and exact description of the invention, which will enable others skilled in the art to which it appertains to make and use the same.

This invention relates to horse-hoof expanders.

The object is to produce a simple and effective device whereby a horse's hoof may be forced out to its original shape, should it contract from any cause; furthermore, to produce a device which will be simple of construction, efficient in use, and may be constructed at comparatively a slight expense.

With these objects in view the invention consists in the novel construction and combination of parts of a horse-hoof expander, as will be hereinafter fully described in the specification, illustrated in the drawings, and pointed out in the claims.

In the accompanying drawings, forming part of this specification, and in which like letters of reference indicate corresponding parts, Figure 1 is a plan view of the device in place on a horse's hoof. Fig. 2 is a longitudinal sectional view of one of the arms of my improved horse-hoof expander. Fig. 3 is a perspective view of the other arm, showing the bayonet-slots therein; and Fig. 4 is a detail view of the pin used for holding the device intact.

Referring to the drawings, A designates the hoof-expander, which may be made of any suitable material, but preferably of iron. This expander consists of two parts $a$ and $a'$, the portion $a$ being provided with a number of bayonet-slots $a^2$, which are formed on the arm $a^3$, the lower end $a^4$ of which arm forms a shoulder extending nearly at right angles to the shoulder $a^3$ and terminating in a point $a^5$, forming that portion which engages the shoe when the device is intact. The other arm $a'$ is provided with a longitudinal slot $a^6$, in which the shoulder or arm $a^3$ fits. At a point preferably near the outer end of the slot $a^6$ is secured a rivet $a^7$, designed to engage the bayonet-slots $a^2$ in the arm $a^3$ to hold the device secure. The lower portion $a^8$ forms a toe similar to the one $a^5$ on the arm $a$.

When this device is to be used, the toes $a^5$ and $a^8$ are inserted under the shoe or against the hoof, as shown in Fig. 1, and the device straightened out, so as to bear with some force against the sides of the hoof. A pin B is then inserted through the opening $a^9$ in the arm $a'$ and through one of the bayonet-slots $a^2$, thus serving to hold the device in the position necessary to cause it to perform the function for which it is designed. As the hoof expands, the rivet $a^7$ is moved from one to another of the bayonet-slots $a^2$ until the hoof has been expanded as far as desired. It will thus be seen that by using this device a horse's hoof may be expanded without pain or inconvenience to it and that it will be found highly efficient and durable in use and may be constructed at but a slight expense.

Having thus fully described my invention, what I claim as new, and desire to secure by Letters Patent, is—

1. In a horse-hoof expander, the combination of an arm provided with bayonet-slots, an arm having a longitudinal slot in which the said slotted arm fits, and a rivet for engaging the said slots, and a pin designed to pass through an opening in the slotted arm and engage the bayonet-slots to lock the device together, substantially as described.

2. In a horse-hoof expander, the combination of an arm provided with bayonet-slots, an arm having a longitudinal slot in which the said slotted arm fits, and a rivet for engaging the said slots, a pin designed to pass through an opening in the slotted arm and engage the bayonet-slots to lock the device together, and toes on the said arms for engaging hoofs, substantially as described.

In testimony that I claim the foregoing as my own I have hereunto affixed my signature in presence of two witnesses.

BURTON STEWART.

Witnesses:
JOHN A. McMICHAEL,
AARON JONES.